US012287180B2

(12) United States Patent
Huling, Jr. et al.

(10) Patent No.: US 12,287,180 B2
(45) Date of Patent: Apr. 29, 2025

(54) UTILIZING A SEAT ASSEMBLY HAVING A SET OF LIMIT STRAPS TO LIMIT DEFLECTION

(71) Applicant: Textron Systems Corporation, Hunt Valley, MD (US)

(72) Inventors: Wyatt Coleman Huling, Jr., Slidell, LA (US); Giovanni Eduardo Sequeira, Abita Springs, LA (US)

(73) Assignee: Textron Systems Corporation, Hunt Valley, MD (US)

( * ) Notice: Subject to any disclaimer, the term of this patent is extended or adjusted under 35 U.S.C. 154(b) by 283 days.

(21) Appl. No.: 17/963,678

(22) Filed: Oct. 11, 2022

(65) Prior Publication Data

US 2023/0118238 A1  Apr. 20, 2023

Related U.S. Application Data

(60) Provisional application No. 63/255,708, filed on Oct. 14, 2021.

(51) Int. Cl.
*B60N 2/42* (2006.01)
*B60N 2/427* (2006.01)
*F41H 7/04* (2006.01)

(52) U.S. Cl.
CPC ......... *F41H 7/046* (2013.01); *B60N 2/42736* (2013.01)

(58) Field of Classification Search
CPC ........... F41H 7/046; B60N 2/015; B60N 2/24; B60N 2/42736; B60N 2/1665
USPC ............. 296/68.1; 297/216.1, 13, 14, 16, 18
See application file for complete search history.

(56) References Cited

U.S. PATENT DOCUMENTS

| 1,907,098 | A | * | 5/1933 | Dowd | B64D 25/06 296/68.1 |
|---|---|---|---|---|---|
| 3,985,388 | A | | 10/1976 | Hogan | |
| 8,939,502 | B2 | * | 1/2015 | Grant | B60R 21/12 297/216.16 |
| 9,174,686 | B1 | | 11/2015 | Messina et al. | |
| 9,738,186 | B2 | | 8/2017 | Krueger et al. | |
| 2022/0234554 | A1 | | 7/2022 | Verhoff et al. | |

FOREIGN PATENT DOCUMENTS

| CA | 2706298 | | 12/2011 |
|---|---|---|---|
| CN | 110303956 | A * | 10/2019 |

OTHER PUBLICATIONS

CN110303956 Text (Year: 2019).*

(Continued)

*Primary Examiner* — Dennis H Pedder
(74) *Attorney, Agent, or Firm* — BainwoodHuang

(57) ABSTRACT

A vehicle includes a vehicle ceiling, a vehicle floor, and a vehicle seat assembly that couples with the vehicle ceiling and the vehicle floor. The vehicle seat assembly includes a seat support that supports a vehicle seat from the vehicle ceiling, a base that forms a slip joint with the seat support from the vehicle floor, and a set of limit straps constructed and arranged to limit deflection of the slip joint in response to deformation between the vehicle ceiling and the vehicle floor (e.g., a vehicle collision, deformation between the vehicle ceiling and the vehicle floor possibly due to a blast, etc.). Each limit strap of the set of limit straps has a first end that attaches to a portion of the slip joint and a second end that attaches to the vehicle floor.

20 Claims, 9 Drawing Sheets

(56) References Cited

OTHER PUBLICATIONS

PCT/US2022/046297; Notification of Transmittal of the International Search Report and the Written Opinion of the International Searching Authority, or the Declaration; Mar. 6, 2023; 11 pages.

* cited by examiner

120

UTILIZING A SEAT ASSEMBLY HAVING A SET OF LIMIT STRAPS TO LIMIT DEFLECTION

CROSS REFERENCE TO RELATED APPLICATIONS

This application is a regular utility application based on earlier-filed U.S. Application No. 63/255,708 filed on Oct. 14, 2021, entitled "UTILIZING A SEAT ASSEMBLY HAVING A SET OF LIMIT STRAPS TO LIMIT DEFLECTION", the contents and teachings of which are hereby incorporated by reference in their entirety.

BACKGROUND

The U.S. Department of Transportation has set forth Federal Motor Vehicle Safety Standards (FMVSS). For example, FMVSS 207 relates to seating systems, the contents and teachings of which are hereby incorporated by reference in their entirety. As another example, FMVSS 210 relates to seat belt assembly anchorages, the contents and teachings of which are hereby incorporated by reference in their entirety.

In compliance with such standards, a conventional vehicle may be equipped with a columnar seat mount having an upper post mounted to the vehicle's ceiling and a lower leg mounted to the vehicle's floor. The lower leg slides into the bottom of the upper post to reduce movement.

SUMMARY

Unfortunately, there are deficiencies to the above-described conventional vehicle. For example, although the columnar seat mount may comply with Federal Regulations, the columnar seat mount is made of relatively heavy steel material which increases the weight of the vehicle thus imposing significant demands on features such as the vehicle's suspension, fuel efficiency, serviceability, and so on.

Moreover, under certain potentially high deformation situations, it may be possible for the columnar seat mount to sustain significant damage. For example, in the context of a conventional vehicle, a collision may cause shearing of one or more of the steel parts of the columnar seat mount due to forward momentum. As another example, in the context of an armored vehicle, a blast may cause severe deformation or rupture of the steel parts of the columnar seat mount due to the uneven direction of the momentum.

In contrast to the above-described conventional vehicle, improved techniques are directed to utilizing a seat assembly having a set of limit straps to limit deflection in the direction of the collision. Along these lines, such a seat assembly may include a seat support that supports a vehicle seat from a vehicle ceiling and a base that forms a slip joint with the seat support from a vehicle floor. In such a situation, the set of limit straps limits deflection of the slip joint in response to a change in momentum caused by an abrupt halt or collision. In the event of a blast, the set of limit straps may limit excessive overall deflection of the columnar seat mount while allowing some movement therefore reducing stress in seat mount material and likelihood of a rupture or failure. In some arrangements, at least a portion of the seat assembly may be formed of light-weight metallic material such as aluminum which provides more compliance than steel to reduce the likelihood of shearing and is lighter in weight than steel thus lowering the weight of the vehicle.

One embodiment is directed to a vehicle which includes a vehicle ceiling, a vehicle floor, and a vehicle seat assembly that couples with the vehicle ceiling and the vehicle floor. The vehicle seat assembly includes a seat support that supports a vehicle seat from the vehicle ceiling, a base that forms a slip joint with the seat support from the vehicle floor, and a set of limit straps constructed and arranged to limit deflection of the slip joint in response to deformation between the vehicle ceiling and the vehicle floor (e.g., a vehicle collision, deformation between the vehicle ceiling and the vehicle floor possibly due to a blast, etc.). Each limit strap of the set of limit straps has a first end that attaches to a portion of the slip joint and a second end that attaches to the vehicle floor.

It should be understood that the vehicle ceiling and the vehicle floor may form at least a portion of a vehicle cabin. Accordingly, the vehicle may be configured for a variety of different environments, applications, functions, etc. Suitable arrangements include reconnaissance vehicles, armored vehicles, commercial vehicles, and the like.

In some arrangements, the vehicle includes an armored vehicle suspension coupled with an armored vehicle cabin. The armored vehicle suspension is constructed and arranged to maneuver the vehicle within a blast-prone environment.

Another embodiment is directed to a vehicle seat assembly which includes:
 (A) a seat support constructed and arranged to support a vehicle seat from a vehicle ceiling,
 (B) a base constructed and arranged to form a slip joint with the seat support from a vehicle floor, and
 (C) a set of limit straps constructed and arranged to limit deflection of the slip joint in response to a large force that may cause deformation between the vehicle ceiling and the vehicle floor.

Each limit strap of the set of limit straps has a first end constructed and arranged to attach to a portion of the slip joint and a second end constructed and arranged to attach to the vehicle floor.

In some arrangements, the seat support includes a midsection that attaches to the vehicle seat, an upper end constructed and arranged to connect with the vehicle ceiling, and a lower end constructed and arranged to reside above the vehicle floor when the seat support forms the slip joint with the base.

In some arrangements, the set of limit straps includes a first limit strap having a first end that attaches to the seat support and a second end that attaches to the vehicle floor.

In some arrangements, the set of limit straps further includes a second limit strap having a first end that attaches to the seat support and a second end that attaches to the vehicle floor. The first and second limit straps are disposed parallel to each other.

In some arrangements, each limit strap of the set of limit straps includes a belt formed of nylon webbing, a first metallic anchor plate disposed at the first end to fasten to the lower end of the seat support, and a second metallic anchor plate disposed at the second end to fasten to the vehicle floor.

In some arrangements, the vehicle seat assembly further includes a first set of bolts that attaches the first metallic anchor plate of each limit strap of the set of limit straps to the lower end of the seat support and a second set of bolts that attaches the second metallic anchor plate of each limit strap of the set of limit straps to the vehicle floor. It should be understood that such bolts enable easy serviceability such as strap installation, replacement, removal, and so on. Furthermore, the use of multiple limit straps that attach using multiple anchor plates enables loads/stresses to be distributed across the bolts rather than at single points thus improving bolt performance and reliability.

In some arrangements, at least a portion of the seat support and the base are formed of aluminum or similar light weight material. Such material does not compromise blast mitigation (e.g., in the context of an armored vehicle).

In some arrangements, the seat support and the base have rectangular cross-sections. Such arrangements provide certain advantages such as strength, manufacturability, etc.

Other embodiments are directed to apparatus, devices, and related componentry. Some embodiments are directed to various vehicles, systems, sub-systems, manufacturing processes, installation processes, methods regarding use, serviceability, and so on, which utilize a seat assembly having a set of limit straps to limit deflection.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to utilizing a seat assembly having a set of limit straps to limit deflection. Along these lines, such a seat assembly may include a seat support that supports a vehicle seat from a vehicle ceiling and a base that forms a slip joint with the seat support from a vehicle floor. In such a situation, the set of limit straps limits deflection of the slip joint in response to a large force that may cause deformation between the vehicle ceiling and the vehicle floor. In some arrangements, at least a portion of the seat assembly may be formed of light-weight metallic material such as aluminum which provides more compliance than steel to reduce the likelihood of shearing and is lighter in weight than steel thus lowering the weight of the vehicle.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
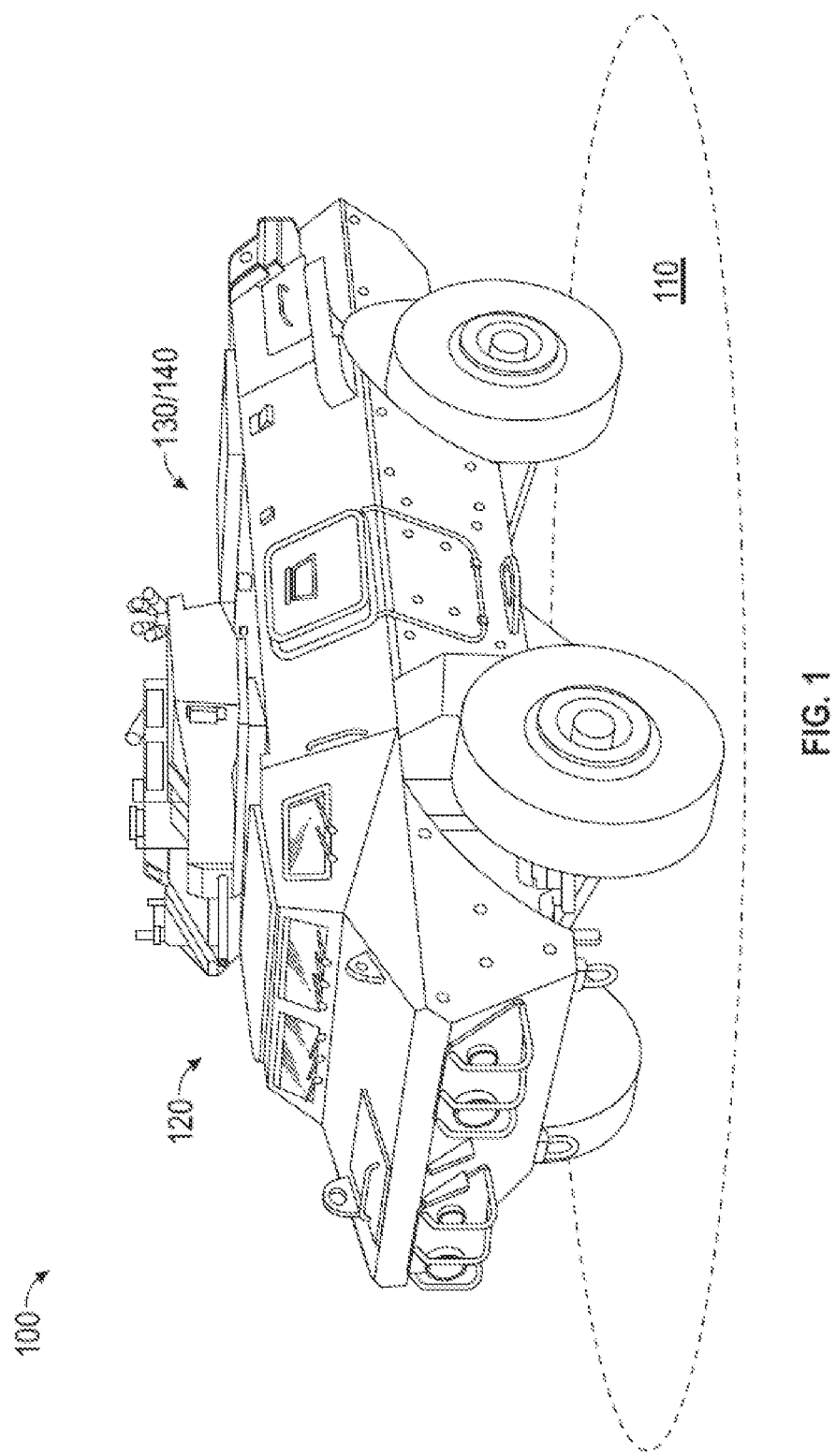
FIG. 1 is a perspective view of an example vehicle which utilizes a seat assembly having a set of limit straps to limit deflection in accordance with certain embodiments.

FIG. 1 shows an example vehicle 100 residing within an environment 110 in accordance with certain embodiments. The vehicle 100 includes, among other things, a vehicle seat assembly 120 which utilizes a set of limit straps to limit deflection. The vehicle 100 may further include various vehicle equipment 130 (e.g., a suspension/frame/body, a propulsion system, a vehicle cabin, specialized componentry, etc.) and non-vehicle equipment 140 (e.g., cargo, add-ons, sensing devices, communications systems, etc.).

During operation, the vehicle 100 may undergo certain stresses due to one or more environmental factors. Along these lines, the vehicle 100 may be called upon to maneuver within extreme environmental conditions, to ride over rough terrain, to operate within in a war zone, and so on.

Figure 2:
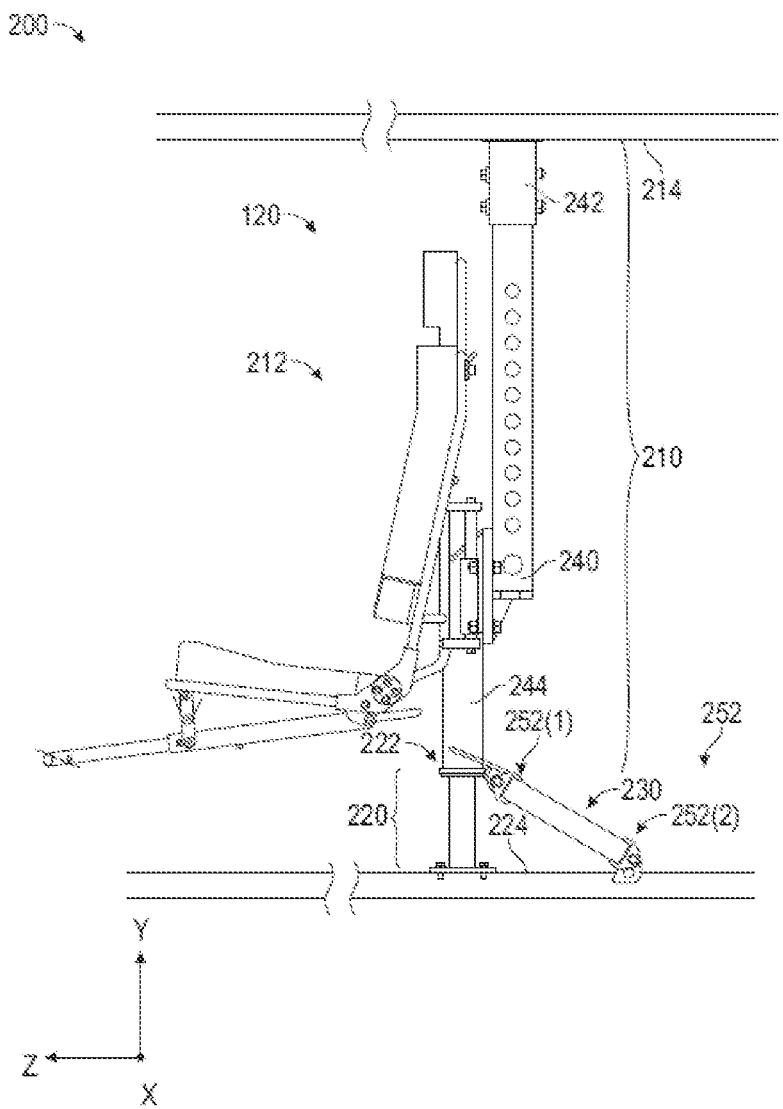
FIG. 2 is a side view of an interior portion of a vehicle which utilizes a seat assembly having a set of limit straps to limit deflection in accordance with certain embodiments.

FIG. 2 shows a side view of an interior portion 200 of the vehicle 100 which includes the vehicle seat assembly 120 in accordance with certain embodiments. The seat assembly 120 includes a seat support 210 constructed and arranged to support a vehicle seat 212 from a vehicle ceiling 214. The seat assembly 120 further includes a base 220 constructed and arranged to form a slip joint 222 with the seat support 210 from a vehicle floor 224. The seat assembly 120 further includes a set of limit straps 230 (i.e., one or more limit straps 230) constructed and arranged to limit deflection of the slip joint 222 in response to deformation between the vehicle ceiling 214 and the vehicle floor 224.

In some arrangements, the vehicle ceiling 214 and the vehicle floor 224 form at least a portion of an armored vehicle cabin. In such arrangements, the vehicle 100 (FIG. 1) may be equipped with an armored vehicle suspension, coupled with the armored vehicle cabin, to enable the vehicle 100 to maneuver effectively within a blast-prone environment (over off-road terrain, while encountering blasts and/or under attack, and so on).

As shown in FIG. 2, the seat support 210 includes a midsection 240 that attaches to the vehicle seat 212, an upper end 242 that connects with the vehicle ceiling 214, and a lower end 244 that resides above the vehicle floor 224 when the seat support 210 forms the slip joint 222 with the base 220.

As further shown in FIG. 2, each limit strap 230 of the set of limit straps has a first end 252(1) that attaches to a portion of the slip joint 222 and a second end 252(2) that attaches to the vehicle floor 224. As will be described in further detail shortly, the first ends 252(1) fasten to the lower end 244 (e.g., a bottom portion) of the seat support 210.

During operation, it is possible for the seat support 210 and the base 220 to move relative to each other. For example, the vehicle ceiling 214 and the vehicle floor 224 may move relative to each other along the Y-axis causing the slip joint 222 to actuate or translate. During such translation, the seat portion 210 slides over the base 220 while supporting and maintaining proper positioning of the seat 212.

In some situations, the vehicle ceiling 214 and the vehicle floor 224 may move in a different or awkward manner such as side to side, in a torqueing or twisting manner, combinations thereof, and so on. In such situations, the set of limit straps 230 prevents the slip joint 222 from over-deflecting. For example, although the bottom portion 240 of the seat portion 210 may be urged in the positive Z-direction, the set of limit straps 230 limits the range of motion of the bottom portion 240 thus preventing the slip joint 222 from extending too far in the Z-direction. In accordance with certain embodiments, the set of limit straps 230 limits the lower end 244 of the seat support 210 to a predefined displacement threshold in the Z-direction (e.g., an inch, two inches, four inches, six inches, etc.). Accordingly, the seat assembly 120 is able to withstand such movement and avoid damage.

Figure 3:
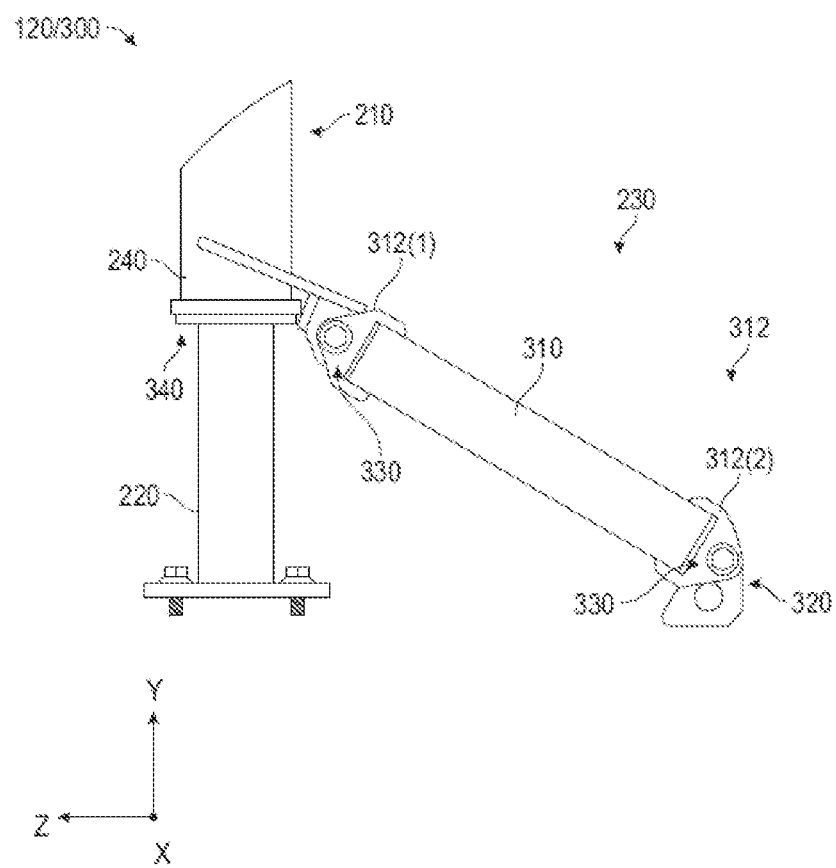
FIG. 3 is a perspective view of a portion of a seat assembly in accordance with certain embodiments.
Figure 4:
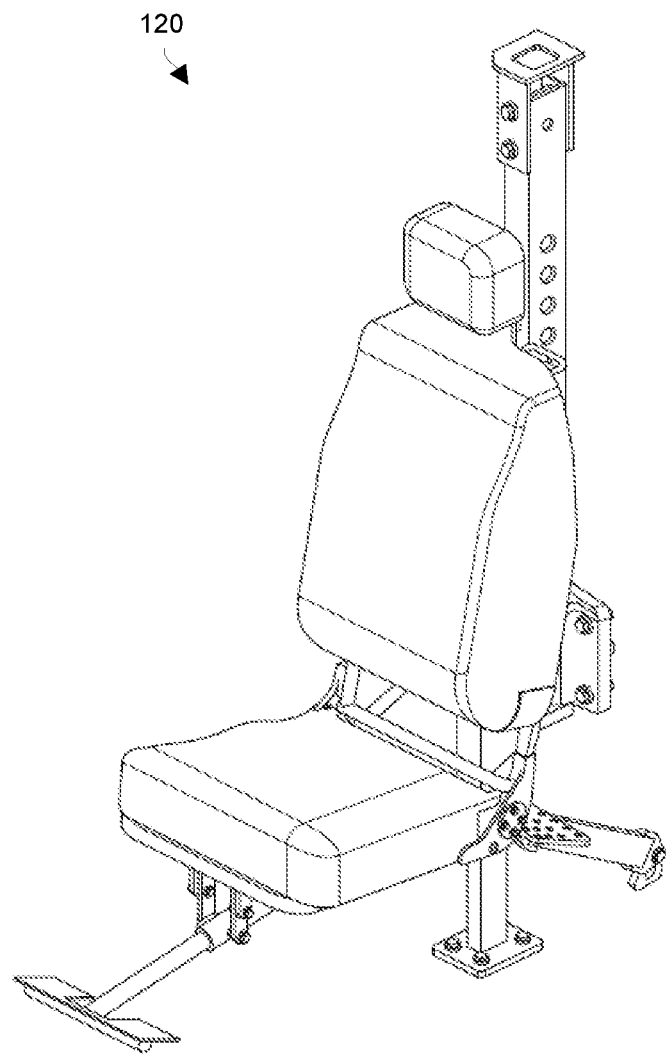
FIG. 4 is a front view of the seat assembly in accordance with certain embodiments.
Figure 7A:
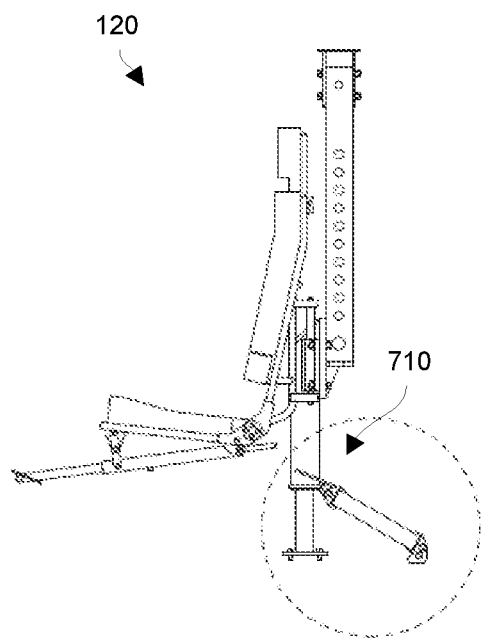
FIG. 7A is a side view of the seat assembly in accordance with certain embodiments.
Figure 7B:
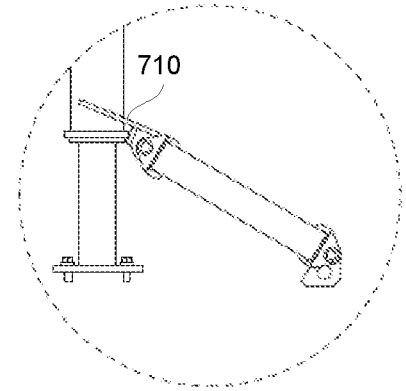
FIG. 7B is a detailed side view of a portion of the seat assembly in accordance with certain embodiments.
Figure 8A:
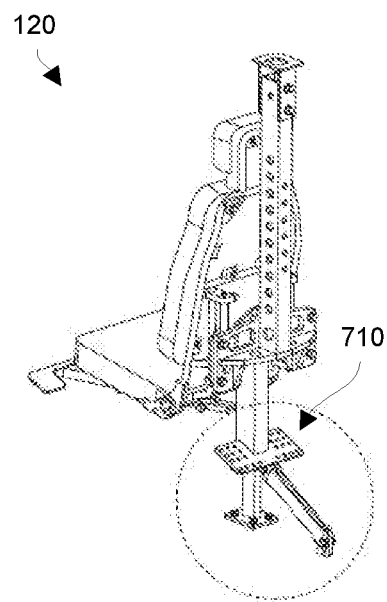
FIG. 8A is a reverse perspective view of the seat assembly in accordance with certain embodiments.
Figure 8B:
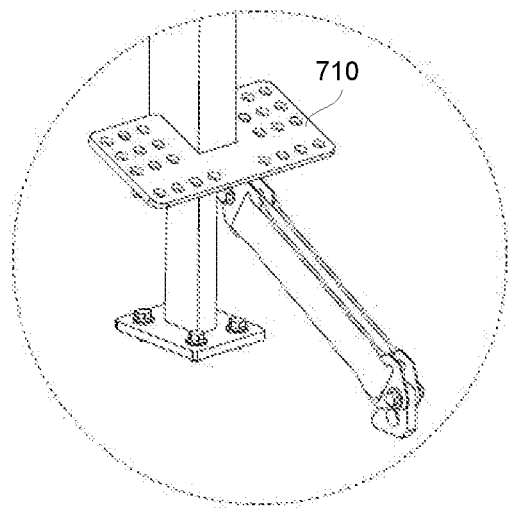
FIG. 8B is a detailed reverse perspective view of a portion of the seat assembly in accordance with certain embodiments.
Figure 9A:
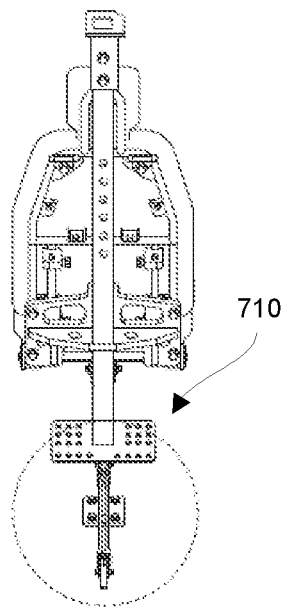
FIG. 9A is a reverse view of the seat assembly in accordance with certain embodiments.
Figure 9B:
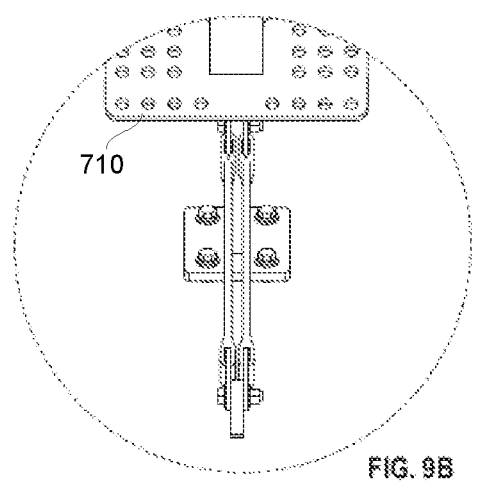
FIG. 9B is a detailed reverse view of a portion of the seat assembly in accordance with certain embodiments.

FIGS. 3 through 9B show further details. Along these lines, FIG. 3 provides a detailed view 300 of a portion of the seat assembly 120. In accordance with certain embodiments, there are multiple limit straps 230, e.g., two limit straps 230 which are parallel to each other as shown in FIGS. 8B and 9B.

Each limit strap 230 of the set of limit straps (e.g., see FIG. 3) includes a belt 310, a first metallic anchor plate 312(1) that fastens to the lower end 240 of the seat support 210, and a second metallic anchor plate 312(2) that fastens to an anchor 320 on the vehicle floor 224 (FIG. 2).

In accordance with certain embodiments, the belts 310 are formed of a material that provides compliance, pull strength, and resiliency. Suitable material includes mil spec nylon webbing, other forms of seat belt material, and/or other fabric-like substances that provide similar properties.

In some arrangements, the anchor plates 312 fasten using hardware. In accordance with certain embodiments, a single bolt 330 attaches multiple anchor plates 312 of multiple limit straps 230. Accordingly, stresses/loading on the bolt 330 and through the limit straps 230 are more effectively distributed throughout thus avoiding failure at a single point.

In some arrangements, the slip joint 222 may be provisioned with a bushing 340 that separates the ends of the seat support 210 and the base 220. Such a bushing 340 permits further compliance between the seat support 210 and the base 220.

In accordance with certain embodiments, the seat assembly 120 is shown as supporting a seat for a single user. However, this is by way of example only and in other embodiments, the seat assembly 120 supports a seat configured for multiple users.

Figure 5:
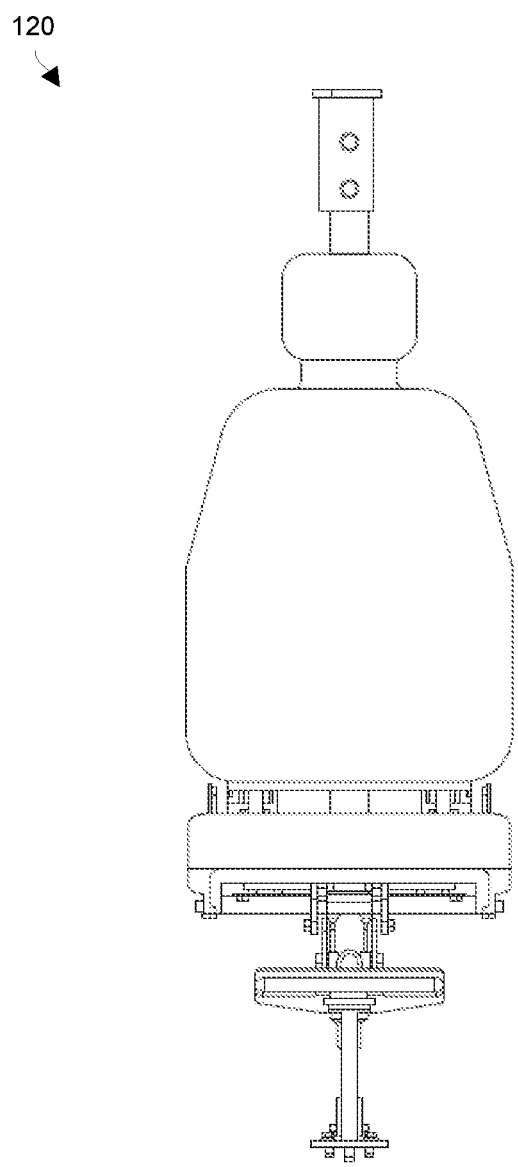
FIG. 5 is yet another view of the seat assembly in accordance with certain embodiments.
Figure 6:
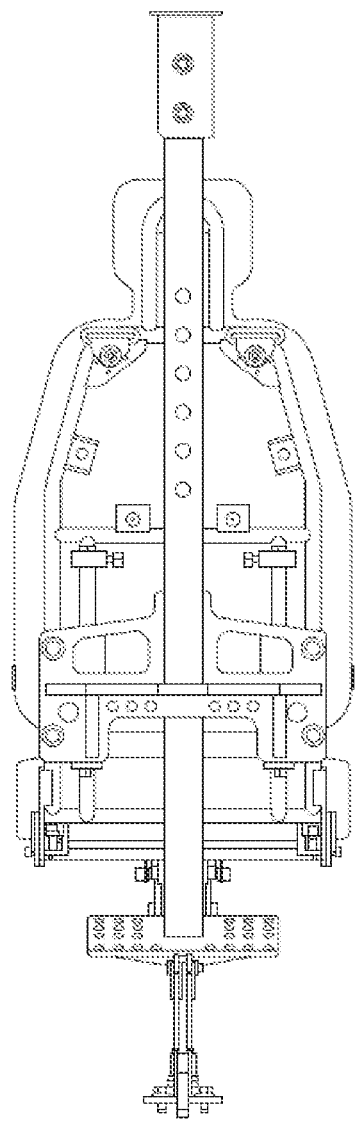
FIG. 6 is a rear (or reverse) view of the seat assembly in accordance with certain embodiments.

A front view of an example seat is provided in FIG. 5. A reverse view of the example seat is provided in FIG. 6. It should be appreciated that the set of limit straps 230 limit over-deflection of the seat assembly 120 in the forward direction. This forward direction is the positive Z-direction in FIG. 2.

A similar set of limit straps 230 may be employed to limit over-deflection of the seat assembly 120 in other directions such as the rear direction, the side directions, and so on. In another embodiment, another set of limit straps 230 restrains the seat assembly 120 from deflecting too far in the negative Z-direction in FIG. 2. In yet another embodiment, other sets of limit straps 230 may restrain the seat assembly 120 from deflecting too far along in different directions along the X-axis in FIG. 2, and so on. It should be appreciated that the limit straps 230 may be employed to limit deflecting in a single direction or multiple directions in accordance with certain embodiments.

Other views of the example seat are provided in FIG. 7A, FIG. 8A, and FIG. 9A to illustrated the context of further connection details shown in FIG. 7B, FIG. 8B, and FIG. 9B, respectively. Also shown in these figures are views of a foot rest 710 which is angled (or inclined) in an upward, rear-to-front direction. Such a foot rest may be used by one or more passengers other than the passenger sitting on the seat assembly 120 (e.g., a passenger sitting in another seat assembly 120 immediately behind that shown in FIG. 7A, FIG. 8A, and FIG. 9A).

As described above, improved techniques are directed to utilizing a seat assembly 120 having a set of limit straps 230 to limit deflection. Along these lines, such a seat assembly 120 may include a seat support 210 that supports a vehicle seat 212 from a vehicle ceiling 214 and a base 220 that forms a slip joint 222 with the seat support 210 from a vehicle floor 224. In such a situation, the set of limit straps 230 limits deflection of the slip joint 222 in response to a change in momentum caused by an abrupt halt, a collision, etc. In the event of a blast, the set of limit straps 230 may limit excessive overall deflection of the columnar seat mount while allowing some movement therefore reducing stress in seat mount material and likelihood of a rupture or failure. In some arrangements, at least a portion of the seat assembly 120 may be formed of light-weight metallic material such as aluminum which provides more compliance than steel to reduce the likelihood of shearing and is lighter in weight than steel thus lowering the weight of the vehicle 100.

It should be understood that other sets of limit straps 230 may be employed to limit deflection of the seat assembly 120 in various other directions such as the negative Z-direction, the positive X-direction, the negative X-direction, combinations thereof, etc. Moreover, such limit straps 230 may be angled more steeply from the vehicle floor 224 to limit deflection along the Y-axis in accordance with certain embodiments.

Furthermore, in accordance with certain embodiments, one or more limit straps 230 may attach to a portion of the vehicle 100 other than the vehicle floor 224. For example, in accordance with certain embodiments, the end of one or more limit strap 230 attaches to a wall, the vehicle ceiling 214, a beam or other structure accessible within the vehicle cabin, combinations thereof, and so on.

As shown in the figures, there are two limit straps extending in a side-by-side configuration in accordance with certain embodiments. As a result, the loading on the attaching hardware is distributed, e.g., each limit strap applies loading to a different portion of the attaching bolt. In some embodiments, the number of limit straps 230 in each set of limit straps 230 is a number different than two, such as one, three, four, etc. In some embodiments, the number of limit straps 230 in different sets of limit straps 230 is different to accommodate different scenarios (e.g., different deflection limits, different deflection directions, etc.).

Additionally, it should be understood that the portions of the seat assembly 120, which are mounted to the various other portions of the vehicle 100, may be robustly and reliably attached. Techniques for attaching these portions of the set assembly 120 to the portions of the vehicle 100 include bolts, anchors, welds, combinations thereof, etc.

Furthermore, the attachment points may be plating (e.g., a floor plate), a beam, a support member, trusswork, combinations thereof, and so on.

It should be appreciated that, conventionally, a company may design a seat post or mount that can withstand the FMVSS pull test for compliance by hard mounting the post to other parts of the vehicle. This can have the downsides of increased weight or in the case of an armored vehicle, negative blast mitigation performance.

It should be appreciated that certain improvements disclosed herein can be utilized to drastically reduce weight from the seat post structure or alternate material options without compromising compliance to certain standards. In the case of armored vehicles, this use case also has the benefit of not adding any consequences to blast mitigation steps that a hard mounted seat post may have. Such improvements may be employed in both military and commercial automotive vehicles.

Moreover, the various improvements disclosed herein may be implemented in craft other than land vehicles. In accordance with certain embodiments, the improvements are deployed in non-land vehicles such as aircraft, watercraft, amphibious vehicles, combinations thereof, and so on.

In accordance with certain embodiments, there are one or more of the following differentiators:
Ultra-Lightweight
Universally Applicable
No added negative effects to blast mitigation in armored vehicles
Utilization of automotive limit straps which use mil-spec nylon webbing The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

What is claimed is:

1. A vehicle, comprising:
   a vehicle ceiling;
   a vehicle floor; and
   a vehicle seat assembly that couples with the vehicle ceiling and the vehicle floor, the vehicle seat assembly including:
   a seat support that supports a vehicle seat weight from the vehicle ceiling,
   a base that forms a slip joint with the seat support from the vehicle floor, and
   a set of limit straps constructed and arranged to limit deflection of the slip joint in response to deformation between the vehicle ceiling and the vehicle floor, each limit strap of the set of limit straps having a first end that attaches to a portion of the slip joint and a second end that attaches to the vehicle floor.

2. A vehicle as in claim 1 wherein the vehicle ceiling and the vehicle floor form at least a portion of an armored vehicle cabin.

3. A vehicle as in claim 2 wherein the seat support of the vehicle seat assembly includes a midsection constructed and arranged to attach to a vehicle seat that provides the vehicle seat weight, an upper end constructed and arranged to connect with the vehicle ceiling, and a lower end constructed and arranged to reside above the vehicle floor when the seat support forms the slip joint with the base.

4. A vehicle as in claim 3 wherein the set of limit straps of the vehicle seat assembly includes:
   a first limit strap having a first end that attaches to the seat support and a second end that attaches to the vehicle floor.

5. A vehicle as in claim 4 wherein the set of limit straps further includes:
   a second limit strap having a first end that attaches to the seat support and a second end that attaches to the vehicle floor, the first and second limit straps being disposed parallel to each other.

6. A vehicle as in claim 3 wherein each limit strap of the set of limit straps includes a belt formed of nylon webbing, a first metallic anchor plate disposed at the first end to fasten to the lower end of the seat support, and a second metallic anchor plate disposed at the second end to fasten to the vehicle floor.

7. A vehicle as in claim 6 wherein the vehicle seat assembly further includes:
   a first set of bolts that attaches the first metallic anchor plate of each limit strap of the set of limit straps to the lower end of the seat support and a second set of bolts that attaches the second metallic anchor plate of each limit strap of the set of limit straps to the vehicle floor.

8. A vehicle as in claim 3 wherein the seat support and the base of the vehicle seat assembly are formed of aluminum.

9. A vehicle as in claim 8 wherein the seat support and the base of the vehicle seat assembly have rectangular cross-sections.

10. A vehicle as in claim 2, further comprising:
    an armored vehicle suspension coupled with the armored vehicle cabin, the armored vehicle suspension being constructed and arranged to maneuver the vehicle within a blast-prone environment.

11. A vehicle seat assembly, comprising:
    a seat support constructed and arranged to support a vehicle seat weight from a vehicle ceiling;
    a base constructed and arranged to form a slip joint with the seat support from a vehicle floor; and
    a set of limit straps constructed and arranged to limit deflection of the slip joint in response to deformation between the vehicle ceiling and the vehicle floor, each limit strap of the set of limit straps having a first end constructed and arranged to attach to a portion of the slip joint and a second end constructed and arranged to attach to the vehicle floor.

12. A vehicle seat assembly as in claim 11 wherein the seat support includes a midsection constructed and arranged to attach to a vehicle seat that provides the vehicle seat weight, an upper end constructed and arranged to connect with the vehicle ceiling, and a lower end constructed and arranged to reside above the vehicle floor when the seat support forms the slip joint with the base.

13. A vehicle seat assembly as in claim 12 wherein the set of limit straps includes:
    a first limit strap having a first end that attaches to the seat support and a second end that attaches to the vehicle floor.

14. A vehicle seat assembly as in claim 13 wherein the set of limit straps further includes:
    a second limit strap having a first end that attaches to the seat support and a second end that attaches to the vehicle floor, the first and second limit straps being disposed parallel to each other.

15. A vehicle seat assembly as in claim 12 wherein each limit strap of the set of limit straps includes a belt formed of nylon webbing, a first metallic anchor plate disposed at the first end to fasten to the lower end of the seat support, and a second metallic anchor plate disposed at the second end to fasten to the vehicle floor.

16. A vehicle seat assembly as in claim 15, further comprising:
- a first set of bolts that attaches the first metallic anchor plate of each limit strap of the set of limit straps to the lower end of the seat support and a second set of bolts that attaches the second metallic anchor plate of each limit strap of the set of limit straps to the vehicle floor.

17. A vehicle seat assembly as in claim 12 wherein the seat support and the base are formed of aluminum.

18. A vehicle seat assembly as in claim 17 wherein the seat support and the base have rectangular cross-sections.

19. A vehicle as in claim 1 wherein the seat support of the seat assembly is constructed and arranged to orient a vehicle seat that provides the vehicle seat weight in a forward facing direction which is parallel to a plane defined by the vehicle floor; and
- wherein each limit strap of the set of limit straps is constructed and arranged to extend from the vehicle floor in an upward and forward direction between the vehicle floor and the slip joint to limit over-deflection of the seat assembly in the forward direction.

20. A vehicle as in claim 1 wherein the seat support has a top seat support end which attaches to the vehicle ceiling and a bottom seat support end which resides over the floor;
- wherein the base has a bottom base end which attaches to the vehicle floor and a top base end which resides below the vehicle ceiling; and
- wherein the bottom seat support end of the seat support and the top base end of the base engage each other to form the slip joint.

\* \* \* \* \*